United States Patent [19]

Rose

[11] Patent Number: 5,484,028
[45] Date of Patent: Jan. 16, 1996

[54] METHOD OF DRILLING WITH FLUID INCLUDING NUT CORK AND DRILLING FLUID ADDITIVE

[75] Inventor: Ron A. Rose, Lufkin, Tex.

[73] Assignee: Grinding & Sizing Co., Inc., Houston, Tex.

[21] Appl. No.: 292,258

[22] Filed: Aug. 18, 1994

[51] Int. Cl.⁶ .................. E21B 7/00; C09K 7/06
[52] U.S. Cl. ............................ 175/72; 507/104
[58] Field of Search .................. 175/72; 260/7; 507/104

[56] References Cited

U.S. PATENT DOCUMENTS

| | | |
|---|---|---|
| 3,629,102 | 12/1971 | Lummus et al. . |
| 4,201,700 | 5/1980 | Chen .................. 260/7 |
| 4,247,403 | 1/1981 | Foley et al. . |
| 4,531,594 | 7/1985 | Cowan . |
| 5,071,575 | 12/1991 | House et al. . |
| 5,076,944 | 12/1991 | Cowan et al. . |
| 5,134,118 | 7/1992 | Patel et al. . |
| 5,147,852 | 9/1992 | Cowan et al. . |
| 5,180,020 | 1/1993 | Fuh et al. . |

*Primary Examiner*—William P. Neuder
*Attorney, Agent, or Firm*—Vaden, Eickenroht, Thompson & Feather

[57] ABSTRACT

The cork or pith portion of various nuts is utilized as a seepage loss reducing additive without increasing, and in some cases reducing, the viscosity of the drilling mud used in drilling boreholes.

20 Claims, No Drawings

METHOD OF DRILLING WITH FLUID INCLUDING NUT CORK AND DRILLING FLUID ADDITIVE

BACKGROUND OF THE INVENTION

The invention relates to an improved method for decreasing the fluid loss or seepage loss from a drilling fluid.

A drilling mud system is designed to be a circulating system, hopefully, with all the fluid retained in the system itself. However, various types of losses do occur during the drilling operation. These losses occur on the surface due to storage, evaporation, etc. Other losses occur on the surface as a result of a certain amount of the mud adhering to the drill solids that are finally disposed of from the system. However, the greatest loss of fluid generally occurs down hole during a drilling operation. These losses can take several different forms. For example, large, gross loss of whole fluid (solids and liquid) is commonly referred to as lost circulation. Lost circulation can be anywhere from 100% to only a partial loss of returns down to 20% or 30%. At the other extreme is a loss of only the liquid phase which is generally referred to as fluid loss (liquid phase only). This loss occurs as the result of the actual filtration of the solids by the formation due to a differential pressure from the fluid column to the formation. A generalized category that is referred to as seepage loss occurs when there is a combination of whole loss of fluid coupled with filtration losses. These losses are small but continuous.

Up until about 1973 seepage loss was not considered an important cost of running an oil mud. This was due to the fact that the cost of diesel at that time was in the $0.30/gal range, or approximately $12.60/bbl. No. 2 diesel fuel, which is the most commonly available oil used in oil base muds, represented a very insignificant cost of the drilling fluid. However, as the price of oil increased to above $1.00/gal, even small losses over a period of time became important. Small losses of oil base mud drilling fluid over a period of usage as a result of seepage loss/fluid loss in oils muds can be a significant cost in running the already expensive oil mud systems.

With the advent of "relaxed fluid-loss" or low-colloid oil muds, even higher losses can and do occur. A recognized offset to this cost, however, is the potential reduction of time and oil muds used due to the increase in penetration rate.

Density is one of the most important mud property affecting penetration rate. For any given formation pressure, the higher the density, the greater will be the differential pressure and consequently, the greater the static chip hold down, and likelihood of bottom-hole and bit balling. Decreasing mud density decreases dynamic chip hold down, permitting faster rpm, and by decreasing pressure losses in the drill pipe, increases hydraulic horsepower available at the bit. Thus the lowest possible mud density should always be carried. Wherever possible, an underbalanced mud column should be used. In normally pressured formations, differential pressures should be kept no higher than necessary to establish a filter cake on unconsolidated sands.

Viscosity is another mud property that materially influences penetration rate. Low viscosity promotes fast rates mainly because of good scavenging of cuttings from the under bit. The relevant viscosity is the effective viscosity at the shear rate prevailing under the bit, not the plastic or funnel viscosity. Low viscosities are particularly important at high rotational speeds because of lower dynamic chip hold down. When the bit tooth strikes, the fractures are at first exceedingly small and the viscosity of the filtrate is probably the relevant factor, but as the chips move out, the viscosity of the mud becomes relevant.

Ideally, in a low-colloid oil mud it would be desirable to have maximum filtration at the face of the bit but zero fluid and seepage losses in the annulus side of the hole. It is usually necessary to compromise in utilizing a low-colloid oil mud by allowing the fluid loss to increase in the oil mud system to a desired level and then holding it at that level in order to achieve a maximum fluid loss at the bit face and yet minimize the seepage loss or fluid in the side of the hole.

During the drilling of thick sections of highly permeable formations, seepage losses and fluid can be excessive when low-colloid oil mud systems are used.

Suggestions have been made for controlling excessive losses in such systems. These include:

1. by-passing all solids removal equipment on a temporary basis and allowing drill solids to be retained until sufficient bridging particles accumulate and form a seal;
2. adding bridging solids, such as fine nut hulls, mica, unmodified lignite, modified asphalts, etc.; and
3. addition of a low concentration of filtration control additive for excessive filtration.

Typically, products such as fine rice and fine nut hulls have been used in oil mud systems, more from the fact that they do not add to the mud problems than from actually providing much assistance in loss control.

Historically, lost circulation, seepage loss, and fluid loss problems have been more difficult to control in oil mud systems than in water base muds because most common additives tended to drastically alter the properties of the oil muds. Cellulose base materials such as wood fibers, ground paper, cotton seed hulls, bagasse, etc., tend to preferentially water wet and can result in breaking the emulsion and "flipping" an expensive system. When this occurs, fluid loss becomes extremely high, weighting material water wets and settles out, water shows up in the filtrate, and other adverse effects occur. The system then has to be reconditioned. This usually results in the system being displaced, hauled into a plant and reconditioned at an extremely high cost. Ground plastics have been suggested and in some cases used, but again, not without problems. Some materials contain plasticizers and other additives that tend to also act as emulsion breakers at low concentrations.

In other cases products such as cellophane, although plastic in nature, have a peculiar wetability and can result in adsorption of water from the emulsion creating water wetting problems.

Many of the modified asphalts are effective as both seepage loss additives (when sized) or as fluid loss additives due to their colloidal nature. These products generally tend to increase the viscosity of the oil phase and add to the colloidal concentration of particles, resulting in decreased penetration rates. Moreover, relatively high concentrations of these products are needed in order to be effective fluid loss or seepage loss additives.

A secondary effect of many of the conventional loss control additives is their ability to absorb the wetting agents from the oil mud and thus deplete the system of the excess required to maintain a stabilized system.

Sometimes the effect Of addition of loss control additives to the low-colloid oil systems are not evident immediately. Both time and temperature play a significant role in effect of such additives. Thus, the addition of loss control additives to these oil mud systems should be selected with care.

Another common problem with many conventional loss control additives, particularly in the seepage loss range, is particle size. Typically, a treatment to the system is made. The material is circulated down hole one time, comes back to the surface and is taken out by even coarse shaker screens, unless the solids-control system is bypassed, and this causes other problems. Not only does additional material have to be added for loss control, but additional emulsifiers and wetting agents have to be added as a result of their being removed by adsorption/absorption on the loss control additives that are being discarded. Thus, an inexpensive loss control additive can become very costly in a low-colloid oil mud if it is not designed specifically for such a system and if it is not applied correctly.

In order to combat or prevent lost circulation, it has been common in the past to add any number of materials to the drilling fluid which act to reduce or prevent flow of the drilling fluid outwardly in a porous stratum thereby arresting a lost circulation condition. These materials are commonly referred to as lost circulation materials. Such prior known lost circulation materials include fibrous, flake, and granular materials. Representative of the organic natural products or modifications thereof that have been disclosed for use as lost circulation materials include nut and seed shells or hulls (pecan, almond, walnut, peach, brazil, coconut, peanut, sunflower, flax, cocoa bean, cottonseed, rice, linseed); crude pectate pulp; feathers; citrus pulp; beet pulp; peat moss fibers; jute; flax; mohair; lechuguilla fibers; cotton; cotton linters; wool; paper; wet-strength paper; sugar cane; bagasse; bamboo; corn stalks; sawdust; straw; wood fiber; cedar fiber; bark chips; cork; popped popcorn; dehydrated vegetable matter (suitably dehydrated carbohydrates such as citrus pulp, oatmeal, tapioca, rice grains, potatoes, carrots, beets, and various grain sorghums); the ground woody ring portion of corn cobs; whole ground corn cobs; hydrophobic, organophilic, water-wettable fibrous materials such as treated cotton, dried bagasse, and dried peat fibers; and specific mixtures of these materials. Many assorted inorganic materials have also been used as lost circulation additives.

Seepage losses can occur to any type of loss zone and in any type of formation when the particles in the mud are not fine enough to complete the seal. It has been established that the maximum allowable drilling fluid loss is on the order of 1 bbl/hr [0.16 $m_3$/h], as measured in the mud pit at the surface. Remedial measures should be taken when the mud loss exceeds 1 bbl/hr [0.16 m3/h].

Many of these problems associated with oil-based muds are also present in the more frequently used water-based muds. Further, in the rotary drilling of wells with aqueous base drilling fluids, various problems associated with the lubricating characteristics of the drilling fluid may occur, such as slow drilling rate, excessive drill pipe torque and drag, differential sticking, etc. See for example U.S. Pat. No. 4,356,096, incorporated herein by reference. This patent discloses that liquid lubricating additives can be sorbed onto certain hydrophobic, organophilic, water wettable absorbents to filter out or deposit in the wall cake on the sides of the borehole. This results in an increased concentration of the liquid lubricant in the wall cake where it is needed. The liquid lubricant can be Dremixed with the sorbent before adding the resulting solid lubricating additive to the drilling fluid.

Materials generically referred to as gelling materials ("gelling agent"), thinners and fluid loss control agents are also typically added to aqueous based drilling fluid formulations. Of these additional materials, each can be added to the formulation in a concentration as rheologically and functionally required by drilling conditions. Typical of gelling agents used in aqueous based drilling fluids are high molecular weight polymers such as PHPA, biopolymers, bentonite and salt gel. Examples of biopolymers are guar gum, starch and the like.

Similarly, it has been found beneficial to add lignosulfonate as thinners for aqueous based drilling fluids. Typically lignosulfonates, modified lignosulfonates, polyphosphates and tannins are added. In other embodiments low molecular weight polyacxrylates can also be added as thinners. Thinners are added to a drilling fluid to reduce flow resistance and gel development. Thinners accomplish this by reducing the mud viscosity, sometimes referred to as thinning the mud or reducing the gel strength. Other functions performed by thinners include to reduce filtration and cake thickness, to counteract the effects on salts, to minimize the effects of water on the formations drilling, to emulsify oil in water, and to stabilize mud properties at elevated temperatures.

It is object of the present invention to provide an additive which is very effective as a seepage loss control agent in both water base and oil base well working fluids.

It is another object of this invention to provide well working compositions having a low seepage loss.

Still another object of this invention is to provide a method of decreasing the seepage loss from water base and oil base well working fluids.

A further object is to provide a seepage loss reducing additive that also reduces the mud viscosity.

These and other objects of the invention will appear to one skilled in the art as the description thereof proceeds.

SUMMARY OF THE INVENTION

As seen above, it has been known in the industry to use ground portions of various organic materials, including the shells of nuts, to prevent lost circulation. However, it has been the practice in the drilling industry to discard the pith portion of organic materials as being detrimental to the drilling process because they cause undesirable increases in the yield point of drilling muds while the addition of only the hard, non-pith portions do not typically appreciably increase the yield point of the drilling mud.

I have found that the cork or pith portion of various nuts may be utilized as a seepage loss reducing additive without increasing, and in some cases reducing, the viscosity of the mud. This is because the cork of certain nuts naturally contain agents that act as thinners. Therefore, the addition of the cork from these nuts do not, as would be expected, increase the viscosity and yield point of drilling muds, but decrease them while still maintaining their seepage loss reduction characteristics.

DETAILED DESCRIPTION OF THE PREFERRED EMBODIMENTS

A pecan tree is a large American hickory tree that bears a smooth shelled edible nut, also called a pecan. Pecans are comprised of four basic parts, a hard outer shell, a softer inner shell, two meat halves, and the cork. The cork is the loose, somewhat spongy tissue that separates the halves of the meat in a nut. Other nuts, including without limitation walnuts, black walnuts, and some hickory nuts also have cork portions.

In the present invention the cork portion of nuts that contain a thinning agent are added to the drilling mud. Preferably the cork portion of pecans, or pecan pith, is added to drilling mud. More preferably, a mixture of the pecan cork and pecan inner shell is added to the drilling mud. The pecan cork and inner shell intrudes into the pores of the strata to prevent seepage.

Pecan cork naturally contains a substantial amount of tannin, a known thinning agent. Therefore, when the pecan cork is introduced as a seepage loss reducing additive, the viscosity of the mud is also decreased. This effect of thinning the mud while simultaneously reducing seepage loss is a substantial advantage over the methods previously utilized.

The meat of pecans are typically removed for sale as edible products. The remainder of the pecan, the hard and soft shells and the cork, are either discarded or used for other purposes. The hard pecan shells are commonly used as a lost circulation additive.

Hard pecan shell lost circulation additives are made by grinding all of the non-meat portions of the pecan and air classifying the ground material to separate the lighter inner shell and pecan cork from the more dense hard pecan shell. Although some of the softer inner shell and cork portions grind to finer particles than the hard shell portions during the grinding step, some of the inner shell and cork remains as large as the hard shell portions after grinding, making screening of the particles an inefficient and ineffective way to separate the inner shell and cork from the hard outer shell.

The ground hard outer shell portions resulting from the grinding and air classification process have long been used as lost circulation additives. However, ground hard pecan shells have proven ineffective for controlling fluid loss. Further, while ground hard pecan shells are useful for reducing the circulation loss portion of seepage loss, they are ineffective for reducing the fluid loss portion of seepage loss and are thus not acceptable as a seepage loss additive without the addition of a separate fluid loss additive.

The inner shell and cork portions resulting from the grinding and air classifying process have prior to this invention been either used for composting or discarded altogether. While it would be possible to separate the inner shell from the cork, such separation is not required to practice this invention.

The nut cork is typically ground so that on average, 1.3 percent of the aggregation nut cork and cork inner shell was retained on an 80 mesh screen, 1.0 percent of the aggregate was retained on a 100 mesh screen, 1.9 percent of the aggregate was retained on a 140 mesh screen, 4.2 percent of the aggregate was retained on a 200 mesh screen, and 91.6 percent of the aggregate passed through a 200 mesh screen. This would typically be called a fine grind. A medium grind, where 95 percent of the aggregate would pass through a 60 mesh screen, has advantages, but the applications are narrower due to the increased particle size.

For a fine grind, 3.0 to 6.0 lbs of nut cork or nut cork and inner shell aggregate per barrel of mud would be used as a seepage control material. To seal off depleted sands, 4.0 to 8.0 lbs of nut cork or nut cork and inner shell aggregate per barrel of mud would be used. As a lost circulation pill for use as disclosed and described in U.S. Pat. No. 4,531,594, incorporated herewith as fully as if set forth herein, 25.0 to 30.0 lbs of nut cork or nut cork and inner shell aggregate per barrel of mud would be used. As a thinner, 2.0 to 6.0 lbs of nut cork or nut cork and inner shell aggregate per barrel of mud would be used. As and API filtrate reducer, 2.0 to 6.0 lbs of nut cork or nut cork and inner shell aggregate per barrel of mud would be used. For a medium or coarse grind, 30.0 to 40.0 lbs of nut cork or nut cork and inner shell aggregate per barrel of mud would be used as a lost circulation pill.

In any of these applications, the nut cork would preferably be mixed through a conventional jet type hopper, but any mechanism that adequately mixed the nut cork into the mud would be acceptable. Although it is possible to separate the nut cork from the inner shell because of the difficulty in separating the nut cork from the inner shell, it is also preferable to leave the cork and ground inner shell admixed.

EXAMPLES

The following examples establish that the nut cork drilling fluid additive of this invention exhibits superior rheological and thixotropic properties in the typical drilling environment.

The nut cork drilling fluid additive evaluated in these examples was formed according to the grinding and air classification method described herein for producing a mixture of nut cork and soft inner shell, and was a fine grind.

EXAMPLE 1

A chemical analysis of the pecan nut cork and inner shell mixture showed it to be 0.10 percent by weight nitrogen, 10.00 percent by weight furfural calculated as pentosan, 0.30 percent by weight sugar calculated as glucose, 60.00 percent by weight cellulose, 24.00 percent by weight lignin, 5.00 percent by weight cutin, 6.50 percent by weight methoxyl, 0.10 percent by weight chlorine, and 0.50 percent by weight ash. The initial water content was 10 percent and the bulk density of the test sample was 25 lbs. per cubic foot.

The base fluid for this test comprised one barrel of fresh water, 25 lbs. per barrel of bentonite, and 6 lbs. per barrel of fine grind pecan nut cork drilling fluid additive. The pH of the resulting fluid was raised to 9.5 by adding sufficient NaOH to form the base fluid.

The base fluid showed a solubility in 15 percent HCL of 28.3 i.e. 28.3 percent of the base fluid dissolved when contacts with a 15 percent HCL solution. In a PPT Test run at 2500 psi and 130 ° F. using a 10 darcy disk, there was a spurt loss of 12.5 ml, a filtrate volume of 23.4 ml, and a PPT value of 59.3. The filtrate in a bed of Frac sand was as follows:

|  | 20/40 | | 60/40 | |
| --- | --- | --- | --- | --- |
| TIME (min) | BASE | NUT CORK | BASE | NUT CORK |
| 10 | 4.5 | 2.8 | 2.3 | 0 |
| 20 | 6.4 | 4.1 | 3.1 | 0 |
| 30 | 8.1 | 5.1 | 3.9 | 0 |
| 35 | 8.8 | 5.4 | 4.3 | 0 |
| 40 | 9.4 | 5.7 | 4.7 | 0 |
| 45 | 10.2 | 5.9 | 5.1 | 0.2 |
| 50 | 10.5 | 6.2 | 5.4 | 0.9 |
| 55 | 11.5 | 6.5 | 5.7 | 1.4 |
| 60 | 12.2 | 6.7 | 6.1 | 1.8 |

Rheologically, the base and the fine grind pecan cork additive showed a plastic viscosity of 5 cp. The yield point was 1 lb./100 sq. ft. for the base and 2 lb./100 sq. ft for the fine grind pecan cork additive. The base gels at 2/7 lb./100 sq. ft., while the fine grind pecan cork additive gels at 1/4 lb./100 sq. ft.

EXAMPLE 2

The base fluid for this test to determine thinning efficiency comprised one barrel of fresh water, 25 lbs. per barrel of bentonite, and 75 lbs. per barrel of barite. The pH of the resulting fluid was raised to 9.5 by adding sufficient NaOH to form the base fluid. The percent thinning efficiency was measured upon the initial addition of 2, 4 and 6 lb. per barrel fine grind pecan cork additive, with the pH adjusted to 9.5 and after hot rolling. The pH was not readjusted after hot rolling. The results are as follows:

|  | BASE | | 2 ppb cork | | 4 ppb cork | | 6 ppb cork | |
|---|---|---|---|---|---|---|---|---|
|  | Init | HR | Init | HR | Init | HR | Init | HR |
| 600 rpm | 84 | 84 | 66 | 85 | 61 | 83 | 56 | 81 |
| 300 rpm | 60 | 55 | 37 | 56 | 33 | 53 | 29 | 52 |
| 200 rpm | 50 | 44 | 27 | 45 | 22 | 45 | 19 | 44 |
| 100 rpm | 38 | 33 | 15 | 33 | 12 | 32 | 10 | 31 |
| 6 rpm | 21 | 11 | 6 | 13 | 4 | 12 | 3 | 11 |
| 3 rpm | 21 | 9 | 5 | 12 | 3 | 11 | 2 | 9 |
| Plastic Visc.(cp) | 24 | 29 | 29 | 29 | 28 | 30 | 27 | 29 |
| Yield Pt (lb./100 ft 2) | 36 | 26 | 8 | 27 | 5 | 23 | 2 | 23 |
| Gels (lb./100 ft 2) | 34/54 | 26/38 | 6/12 | 15/28 | 3/9 | 13/25 | 2/6 | 10/19 |
| Thinning Eff., % | XXX | XXX | 54.4 | 0 | 63.6 | 3.03 | 69.7 | 6.1 |

EXAMPLE 3

The base fluid for this test comprised one barrel of fresh water, 25 lbs. per barrel of bentonite, and 20 lbs. per barrel of fine grind pecan nut cork additive. The pH of the resulting fluid was raised to 9.5 by adding sufficient NaOH to form the base fluid. The filtrate in a bed of Frac sand was as follows:

|  | 20/40 | | 60/40 | |
|---|---|---|---|---|
| TIME (min) | BASE | NUT CORK | BASE | NUT CORK |
| 10 | 5.1 | 0 | 3.9 | 0 |
| 20 | 7.5 | 0 | 6.5 | 0 |
| 30 | 9.8 | 0 | 8.7 | 0 |
| 35 | 10.8 | 0 | 9.6 | 0 |
| 40 | 11.8 | 0 | 10.5 | 0 |
| 45 | 12.8 | 0 | 11.4 | 0 |
| 50 | 13.8 | 0 | 12.3 | 0 |
| 55 | 14.8 | 0 | 13.1 | 0 |
| 60 | 15.6 | 0 | 13.8 | 0 |

Rheologically, the base showed a plastic viscosity of 5 cp. and the fine grind pecan cork additive showed a plastic viscosity of 8 cp. The yield point was 1 lb./100 sq. ft. for the base and 0 lb./100 sq. ft for the fine grind pecan cork additive. The base gels at 2/6 lb./100 sq. ft., while the fine grind pecan cork additive gels at 0/0 lb./100 sq. ft. From these test results it can be concluded that at 20 lb./bbl, fine grind pecan cork additive completely stops the filtrate from penetrating the sand beds and reduces the rheology and gel strengths to 0.

EXAMPLE 4

The base fluid for this test was created by adding to one barrel of fresh water 25 lbs. per barrel of bentonite (stirred 10 minutes), 50 lbs. per barrel rev dust (stirred minutes, pH adjusted with NaOH to 9.5 (stirred 10 minutes) and 75 lbs. per barrel of barite (stirred 20 minutes). Four samples using this base mud were prepared for testing. Sample 1 was pure base mud. Sample 2 was base mud. plus 4 ppb fine grind pecan cork additive. Sample 3 was base mud plus 6 ppb fine grind pecan cork additive. Sample 4 was base mud plus 10 ppb fine grind pecan cork additive.

After stirring 20 minutes on a multimixer, rheologies were tested with the following results:

| Sample | 600/300 | 200/100 | 6/3 | gels | PV | YP |
|---|---|---|---|---|---|---|
| 1 | 114/84 | 73/59 | 40/40 | 61/115 | 30 | 54 |
| 2 | 96/61 | 48/32 | 13/12 | 17/47 | 35 | 26 |
| 3 | 113/73 | 56/38 | 14/13 | 21/49 | 40 | 33 |
| 4 | 120/80 | 63/45 | 18/15 | 21/47 | 40 | 40 |

After hot rolling at 170° F. for 16 hours, the rheologies were tested again with the following results:

| Sample | pH | 200/300 | 200/100 | 6/3 | gels | PV | YP |
|---|---|---|---|---|---|---|---|
| 1 | 7.7 | 111/78 | 67/51 | 31/30 | 41/87 | 33 | 45 |
| 2 | 6.7 | 162/102 | 79/50 | 14/10 | 13/61 | 60 | 42 |
| 3 | 6.8 | 153/98 | 78/52 | 18/15 | 14/67 | 55 | 43 |
| 4 | 7.0 | 160/97 | 72/44 | 7/5 | 8/32 | 63 | 34 |

EXAMPLE 5

The base fluid for this test was created by adding to one barrel of fresh water 25 lbs. per barrel of bentonite, stirring 30 minutes on a multimixer and leaving it to sit for 24 hours. This prehydrated base mud was then pH adjusted with NaOH to 9.5. Four samples using this base mud were prepared for testing. Sample 1 was pure base mud. Sample 2 was base mud plus 6 ppb fine grind pecan cork additive. Sample 3 was base mud, with the pH readjusted to 11.0, plus 6 ppb fine grind pecan cork additive.

After stirring 20 minutes on a multimixer, initial properties were tested with the following results:

| Sample | pH | 600/300 | 200/100 | 6/3 | gels | PV | YP |
|---|---|---|---|---|---|---|---|
| 1 | 9.3 | 54/39 | 33/25 | 15/14 | 19/50 | 15 | 24 |
| 2 | 7.3 | 65/46 | 37/27 | 11/9 | 14/42 | 19 | 27 |
| 3 | 8.5 | 62/44 | 35/24 | 9/7 | 10/36 | 18 | 26 |

After hot rolling at 170 of for 4 hours, the samples were cooled to room temperature, stirred for 5 minutes and tested again with the following results:

| Sample | 600/300 | 200/100 | 6/3 | gels | PV | YP |
|---|---|---|---|---|---|---|
| 1 | 65/46 | 38/28 | 13/12 | 19/44 | 19 | 27 |
| 2 | 44/61 | 21/13 | 2/1 | 2/7 | 16 | 12 |
| 3 | 62/80 | 31/20 | 3/3 | 4/22 | 24 | 14 |

Samples 1 and 2 were then evaluated for LCM and seepage control. One hundred grams of 20/40 frac sand was placed in a room temperature water loss cell. This cell contained a screen and filter paper. Approximately 150 mls of test sample was placed in the cell and capped. One hundred psi pressure was applied for 30 minutes. Results were as follows:

| Sample | Total filtrate (mls) |
|---|---|
| 1 (base mud) | 10.0 |
| 2 (mud plus pecan cork) | 4.4 |

Filtercake was noted on top of the sand in all samples.

The present invention may be used with either waterbase or oil base muds.

The present invention is used underground and not on the surface of the earth.

Thus, the present invention provides a compound, method, and system for improving drilling fluid.

Although a preferred embodiment of the invention has been described, it will be appreciated by those skilled in the art to which the present invention pertains that modifications, changes, and improvements may be made without departing from the spirit of the invention defined by the claims. For example, without limitation as to other modification, changes, and improvements it may be desirable to premix the nut cork additive with about one to two percent (1–2%) by weight of the drilling mud base, typically oil or water, prior to addition of the mixture to drilling mud. Further, the cork additive from nuts other than pecans which contain tannin or another natural thinner may be used rather than pecan cork additive. Additionally, the nut cork additive may be useful as an additive to muds that are neither waterbased or oil-based. Furthermore, the cork portion of the nut may be utilized without the inner shell portion if desired.

What is claimed:

1. A method of carrying out drilling operations wherein a drilling fluid is circulated in a well being drilled in the ground comprising the steps of:

obtaining and grinding nut cork to a powder form, adding said ground nut cork to a drilling fluid, and circulating said drilling fluid, with said ground nut cork added thereto, in said well while drilling operations are being carried out.

2. The method of claim 1, wherein:

said ground nut cork contains a naturally occurring drilling mud thinner.

3. The method of claim 2, wherein:

said naturally occurring drilling mud thinner is tannin.

4. The method of claim 1, wherein:

said ground nut cork is the cork from pecans.

5. A method of carrying out drilling operations wherein a drilling fluid is circulated in a well being drilled in the ground, comprising the steps of:

adding nut cork to a drilling fluid, and circulating said drilling fluid, with said nut cork added thereto, in said well.

6. The method of claim 5, wherein said nut cork is the cork from pecans.

7. A fluid loss additive for drilling fluid comprising at least nut cork.

8. The fluid loss additive of claim 7 further comprising at least drilling mud base.

9. A seepage control additive for drilling fluid comprising at least nut cork.

10. The method of controlling seepage during the drilling of a well comprising the steps of:

adding 3.0 to 6.0 lbs of nut cork per barrel of drilling mud, and circulating said mud, with said nut cork added thereto, in said well.

11. A sealing additive for drilling fluid for sealing depleted sands comprising at least nut cork.

12. The method of sealing depleted sands during the operations of a well comprising the steps of:

adding 4.0 to 8.0 lbs of nut cork per barrel of drilling mud, and circulating said mud, with said nut cork added thereto, in said well.

13. A lost circulation pill for use in drilling operations comprising at least nut cork.

14. The lost circulation pill of claim 13 wherein the pill is further comprised of at least 25.0 to 30.0 pounds of fine grind pecan cork per barrel of drilling mud.

15. The lost circulation pill of claim 13 wherein the pill is further comprised of at least 30.0 to 40.0 pounds of medium grind pecan cork per barrel of drilling mud.

16. A method for reducing lost fluid, seepage or circulation during drilling operations comprising the steps of:

creating a pill of additive comprising at least nut cork, slowly pumping the pill up the annulus between the drill pipe and the sides of the borehole, and recovering the pill as it returns to the surface.

17. A thinning additive for reducing flow resistance and gel development in a drilling fluid comprising at least nut cork.

18. The method of reducing flow resistance and gel development in drilling fluid during the drilling of a well comprising the steps of:

adding 2.0 to 6.0 lbs of nut cork per barrel of drilling mud, and circulating said mud, with said nut cork added thereto in said well.

19. An API filtrate reducing additive comprising at least nut cork.

20. The method of reducing filtrate penetration into sand beds during the drilling of a well comprising the steps of:

adding 2.0 to 6.0 lbs of nut cork per barrel of drilling mud, and circulating said mud, with said nut cork added thereto, in said well.

* * * * *